(12) United States Patent
Kurabayashi et al.

(10) Patent No.: US 12,229,529 B2
(45) Date of Patent: Feb. 18, 2025

(54) PROGRAM GENERATION APPARATUS, PROGRAM GENERATION METHOD AND PROGRAM

(71) Applicant: NIPPON TELEGRAPH AND TELEPHONE CORPORATION, Tokyo (JP)

(72) Inventors: Toshiyuki Kurabayashi, Tokyo (JP); Hiroyuki Kirinuki, Tokyo (JP); Yu Yoshimura, Tokyo (JP)

( * ) Notice: Subject to any disclaimer, the term of this patent is extended or adjusted under 35 U.S.C. 154(b) by 254 days.

(21) Appl. No.: 17/798,591

(22) PCT Filed: Feb. 12, 2020

(86) PCT No.: PCT/JP2020/005389
§ 371 (c)(1),
(2) Date: Aug. 10, 2022

(87) PCT Pub. No.: WO2021/161429
PCT Pub. Date: Aug. 19, 2021

(65) Prior Publication Data
US 2023/0089227 A1 Mar. 23, 2023

(51) Int. Cl.
*G06F 8/30* (2018.01)
*G06N 3/12* (2023.01)

(52) U.S. Cl.
CPC .................... *G06F 8/30* (2013.01); *G06N 3/12* (2013.01)

(58) Field of Classification Search
CPC ..... G06F 8/30; G06F 8/31; G06F 8/33; G06F 8/36; G06F 8/40; G06F 8/427; G06F 8/44; G06F 8/443; G06F 11/3668; G06F 11/3696; G06N 5/013
See application file for complete search history.

(56) References Cited

U.S. PATENT DOCUMENTS

| | | | |
|---|---|---|---|
| 2005/0131672 A1* | 6/2005 | Dalal | G06F 40/284 704/2 |
| 2008/0282108 A1* | 11/2008 | Jojic | G06F 11/3624 714/26 |
| 2017/0212829 A1* | 7/2017 | Bales | G06F 11/3604 |

OTHER PUBLICATIONS

Lu et al. (2015) "Query expansion via Wordnet for effective code search" IEEE 22nd International Conference on Software Analysis, Evolution, and Reengineering (SANER), Mar. 2, 2015, pp. 545-549.

* cited by examiner

*Primary Examiner* — Hanh Thi-Minh Bui

(57) ABSTRACT

The possibility of a desired program being automatically generated is increased by a program generation device including: a storage unit that stores a set of pairs each constituted by a program and natural language that describes a specification of the program; a search unit configured to search for a first program having a structure that is the closest to a structure of a program to be generated, from the set, by inputting natural language that describes a specification of the program to be generated and natural language included in the pairs to a model that has been caused to learn a relationship between natural language describing a specification of a program and similarity of a structure of the program; and a change unit configured to change the first program to generate a second program that satisfies at least one pair of an input value and an output value.

17 Claims, 10 Drawing Sheets

Fig. 5

| SEARCH DATA SET | | 16 |
|---|---|---|

| SPECIFICATION | RETURN SQUARE OF INPUT VALUE |
|---|---|
| PROGRAM (SOURCE CODE) | def getSquare(x):<br>    return multiply(x, x) |

| SPECIFICATION | DETERMINE WHETHER INPUT VALUE IS EVEN NUMBER |
|---|---|
| PROGRAM (SOURCE CODE) | def judgeEven(x):<br>    return (mod(x, 2)==0) |

⋮

PROGRAM GENERATION APPARATUS, PROGRAM GENERATION METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/005389, filed on 12 Feb. 2020, the disclosure of which is hereby incorporated herein by reference in its entirety.

TECHNICAL FIELD

The present invention relates to a program generation device, a program generation method, and a program.

BACKGROUND ART

In recent years, application of IT is increasing throughout the society and insufficiency of IT human resources is a big issue. According to a calculation made by the Ministry of Economy, Trade and Industry, it is estimated that there will be a lack of about 360,000 IT human resources in 2025. In particular, the shortage of IT human resources in implementation processes for which expertise is required is an urgent issue, and there are demands for research and development of automatic programing technologies for automatically carrying out programing.

Since it is difficult to automatically generate a desired program in the absence of a program that serves as a basis, in automatic programing technologies, an approach of automatically generating a desired program using another program as a basis is thought to be promising. In order to obtain a program that serves as the basis in such an approach, it is conceivable to use a method of obtaining the program from a plurality of programs by performing a search. For example, NPL 1 discloses a technology for searching for a program based on similarity of words in a code to a search query.

CITATION LIST

Non Patent Literature

[NPL 1] Meili Lu, X. Sun, S. Wang, D. Lo and Yucong Duan, "Query expansion via WordNet for effective code search," 2015 IEEE 22nd International Conference on Software Analysis, Evolution, and Reengineering (SANER), Montreal, QC, 2015, pp. 545-549.

SUMMARY OF THE INVENTION

Technical Problem

Incidentally, it is desirable that a program that is used as the basis has a structure that is close to the structure of the desired program to be automatically generated. However, when the search for the program is performed based on similarity of words in a code to a search query, the structure of the program is not taken into consideration, and therefore, there is a problem in that it is not always possible to obtain a program that has a structure close to the structure of the desired program.

The present invention was made in view of the foregoing, and has an object of increasing the possibility of the desired program being automatically generated.

Means for Solving the Problem

In order to solve the problem described above, a program generation device includes: a storage unit that stores a set of pairs each constituted by a program and natural language that describes a specification of the program; a search unit configured to search for a first program having a structure that is the closest to a structure of a program to be generated, from the set, by inputting natural language that describes a specification of the program to be generated and natural language included in the pairs to a model that has been caused to learn a relationship between natural language describing a specification of a program and similarity of a structure of the program; and a change unit configured to change the first program to generate a second program that satisfies at least one pair of an input value and an output value.

Effects of the Invention

The possibility of the desired program being automatically generated can be increased.

BRIEF DESCRIPTION OF DRAWINGS

FIG. 5 is a diagram showing an example of a search data set 16.

DESCRIPTION OF EMBODIMENTS

Figure 1:
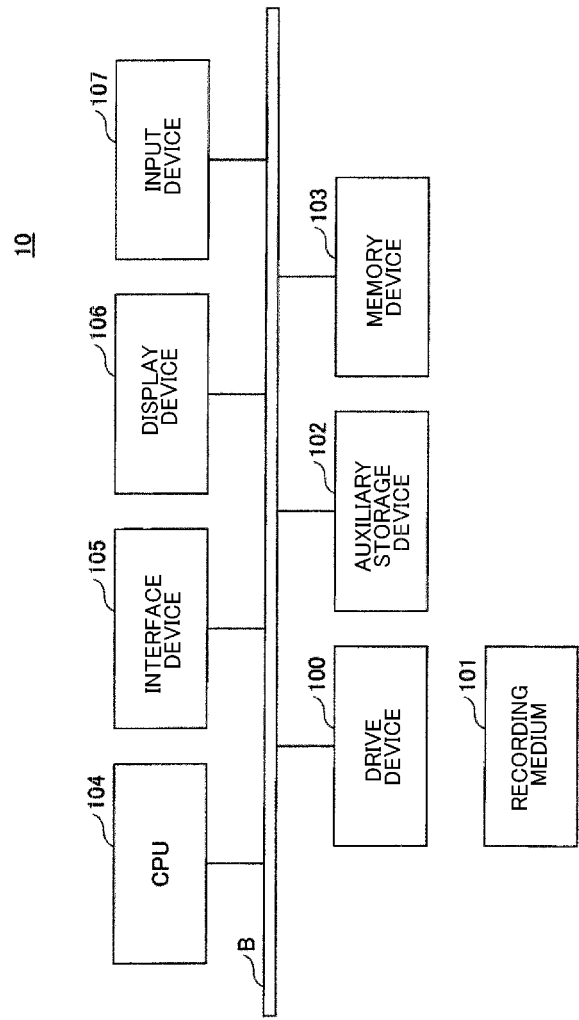
FIG. 1 is a diagram showing an example of a hardware configuration of a program generation device 10 in an embodiment of the present invention.

The following describes an embodiment of the present invention based on the drawings. FIG. 1 is a diagram showing an example of a hardware configuration of a program generation device 10 in the embodiment of the present invention. The program generation device 10 shown in FIG. 1 includes a drive device 100, an auxiliary storage device 102, a memory device 103, a CPU 104, an interface device 105, a display device 106, an input device 107, and the like, which are connected to each other via a bus B.

A program that realizes processing performed in the program generation device 10 is provided using a recording medium 101 such as a CD-ROM. When the recording medium 101 on which the program is stored is set in the drive device 100, the program is installed in the auxiliary storage device 102 from the recording medium 101 via the drive device 100. However, the program does not necessarily have to be installed from the recording medium 101, and may be downloaded from another computer via a network. The auxiliary storage device 102 stores therein the installed program and necessary files, data, and the like.

When a program start instruction is given, the memory device 103 reads the program from the auxiliary storage device 102 and stores the program in the memory device 103. The CPU 104 realizes functions relating to the program generation device 10 in accordance with the program stored in the memory device 103. The interface device 105 is used as an interface for connection to a network. The display device 106 displays GUI (Graphical User Interface) or the like of the program. The input device 107 is constituted by a keyboard and a mouse, for example, and is used to input various operation instructions.

Figure 2:
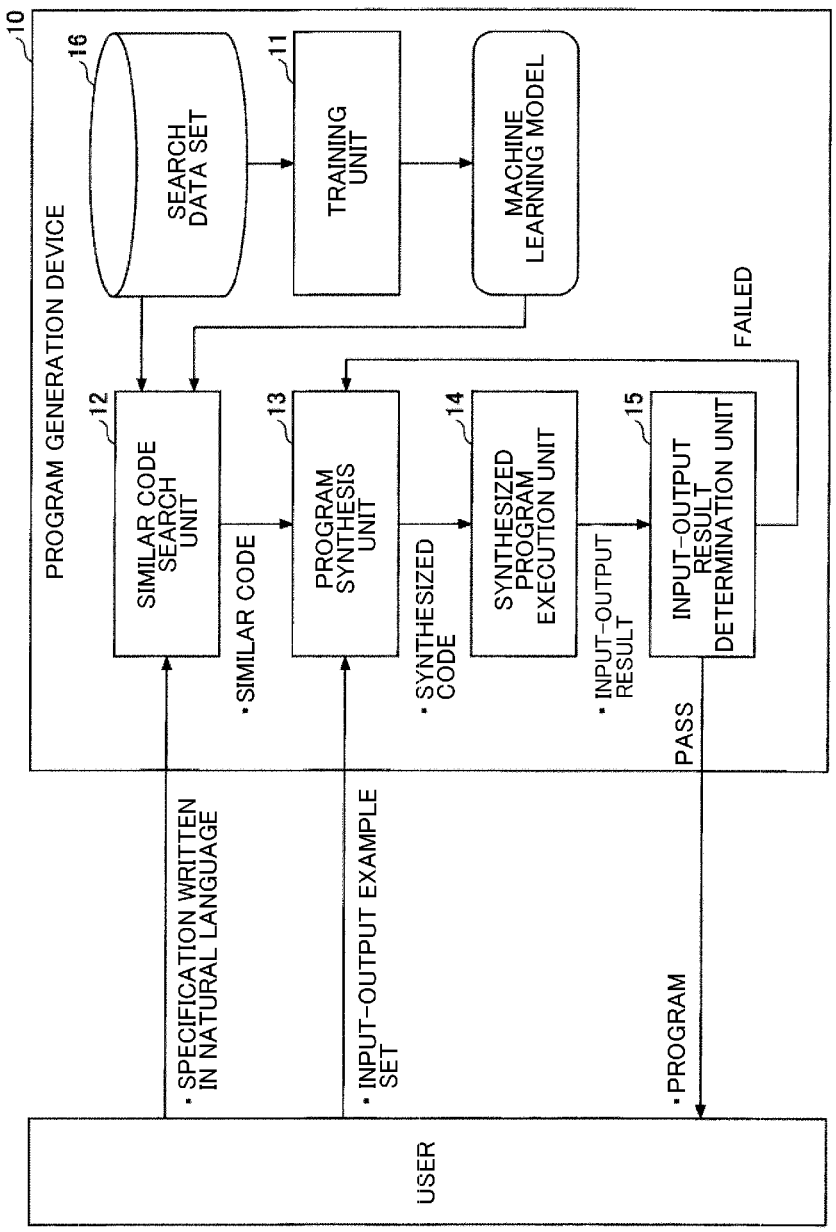
FIG. 2 is a diagram showing an example of a functional configuration of the program generation device 10 in an embodiment of the present invention.

FIG. 2 is a diagram showing an example of a functional configuration of the program generation device 10 in the embodiment of the present invention. The program generation device 10 shown in FIG. 2 includes a training unit 11, a similar code search unit 12, a program synthesis unit 13, a synthesized program execution unit 14, and an input-output result determination unit 15. These units are realized through processing that one or more programs installed in the program generation device 10 cause the CPU 104 to execute.

The program generation device 10 also includes a search data set 16. As described later, the search data set 16 is a set of search data pieces that are each expressed as a pair of a program (a source code of the program) and a specification of the program written in natural language. The search data set 16 is stored in the auxiliary storage device 102, for example. It is preferable that source codes included in the search data are syntactically correct source codes (i.e., satisfy the syntax of a programming language), and therefore, in the following description, it is assumed that the source codes included in the search data are syntactically correct source codes.

Figure 3:
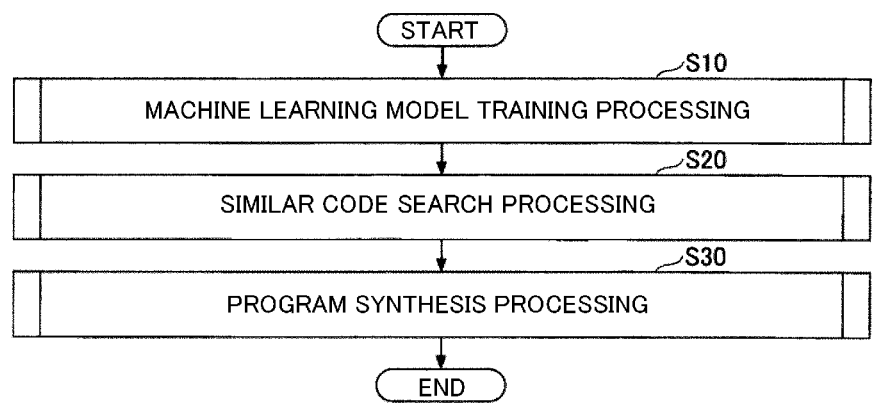
FIG. 3 is a flowchart showing an example of a processing procedure executed by the program generation device 10.

The following describes a processing procedure that is executed by the program generation device 10. FIG. 3 is a flowchart showing an example of the processing procedure executed by the program generation device 10.

First, the training unit 11 executes training processing of a model (hereinafter referred to as a "machine learning model") that is constituted by a neural network such as an RNN (Recurrent Neural Network) (step S10). In the training processing of the machine learning model, the model is caused to learn a relationship between natural language that describes a specification of a program and similarity of the structure of the program. Here, similarity of the structure of a program can be calculated using a method disclosed in Reference Document 1: Yusuke ODA, Shigeru WAKABAYASHI, "Method of Similarity Quantification between Program Codes", research reports of Kobe City College of Technology, for example.

Subsequently, the similar code search unit 12 executes similar code search processing (step S20). In the similar code search processing, a specification that is written in natural language for the program to be generated (hereinafter referred to as the "target program") and specifications written in natural language for programs included in respective search data pieces of the search data set 16 are input to the trained machine learning model, which has been trained in step S10, to find a source code (hereinafter referred to as a "similar code") of a program that has a specification similar to the specification of the target program from the search data set 16. The similar code is a source code that serves as a basis (source) when the target program is automatically generated.

Subsequently, the program synthesis unit 13, the synthesized program execution unit 14, and the input-output result determination unit 15 execute program synthesis processing (step S30). In the program synthesis processing, the target program that satisfies the specification (intention of the creator) is automatically generated by using the similar code found through the similar code search processing, as a basis, and repeating a partial change of the similar code (cumulatively changing the similar code portion by portion) until a program that satisfies input-output examples (at least one pair of an input value and an output value) generated in advance is generated.

That is, in the present embodiment, the possibility of a program conforming to the specification being generated is increased using two types of information, i.e., the specification of the target program written in natural language and input-output examples.

Figure 4:
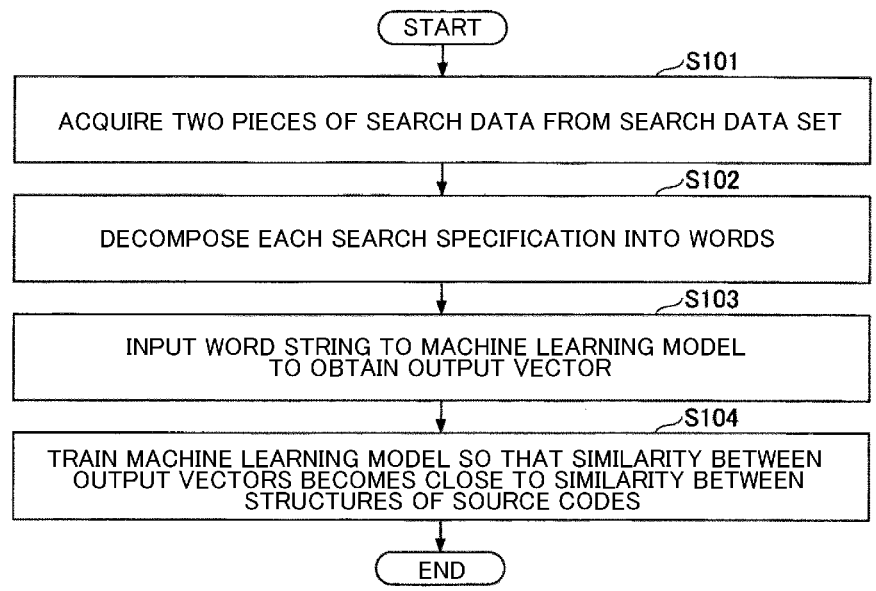
FIG. 4 is a flowchart showing an example of a processing procedure of machine learning model training processing.

Next, details of step S10 shown in FIG. 3 will be described. FIG. 4 is a flowchart showing an example of a processing procedure of the machine learning model training processing.

In step S101, the training unit 11 acquires two pieces of search data at random from the search data set 16.

FIG. 5 is a diagram showing an example of the search data set 16. In FIG. 5, each table in the search data set 16 corresponds to a single piece of search data. The following is the data structure of the search data set 16 written in a form that is based on the BNF (Backus-Naur form) notation.

<search data set>::=[specification source code]+

That is, the search data set 16 is a set of search data pieces that each include a specification (hereinafter referred to as a "search specification") written in natural language and a source code of a program. It should be noted that the source code of the program satisfies the syntax of a programming language, as described above. Such a search data set 16 is prepared in advance.

In the following description, the two pieces of search data acquired at random in step S101 will be referred to as "search data A" and "search data B".

Subsequently, the training unit 11 decomposes (divides) each of a search specification (hereinafter referred to as a "search specification A") included in the search data A and a search specification (hereinafter referred to as a "search specification B") included in the search data B into words. As a result, the search specification A and the search specification B are converted to strings of words (hereinafter referred to as "word strings").

In step S103, the training unit 11 inputs the word string of the search specification A to the machine learning model to obtain an output vector (hereinafter referred to as an "output vector A"). Similarly, the training unit 11 inputs the word string of the search specification B to the machine learning model to obtain an output vector (hereinafter referred to as an "output vector B").

Then, the training unit 11 trains the machine learning model so that similarity between the output vector A and the output vector B becomes close to similarity between the structure of the source code included in the search data A and the structure of the source code included in the search data B (step S104). Thus, it is possible to cause the machine learning model to learn a relationship between natural language that describes a specification of a program and similarity of the structure of the program.

Here, any type of similarity can be used as the similarity between output vectors. For example, cosine similarity between the output vectors can be used. The similarity between the structures of source codes can be calculated using the method disclosed in Reference Document 1 described above.

Steps S101 to S104 are repeatedly executed until the learning converges, for example. Whether or not the learning has converged can be determined based on, for example, a condition that a change amount in the value of an objective function for evaluating closeness between similarity of output vectors and similarity of structures of source codes is smaller than a predetermined value between before and after the repetition, or a condition that the repetition has been performed at least a predetermined number of times.

Figure 6:
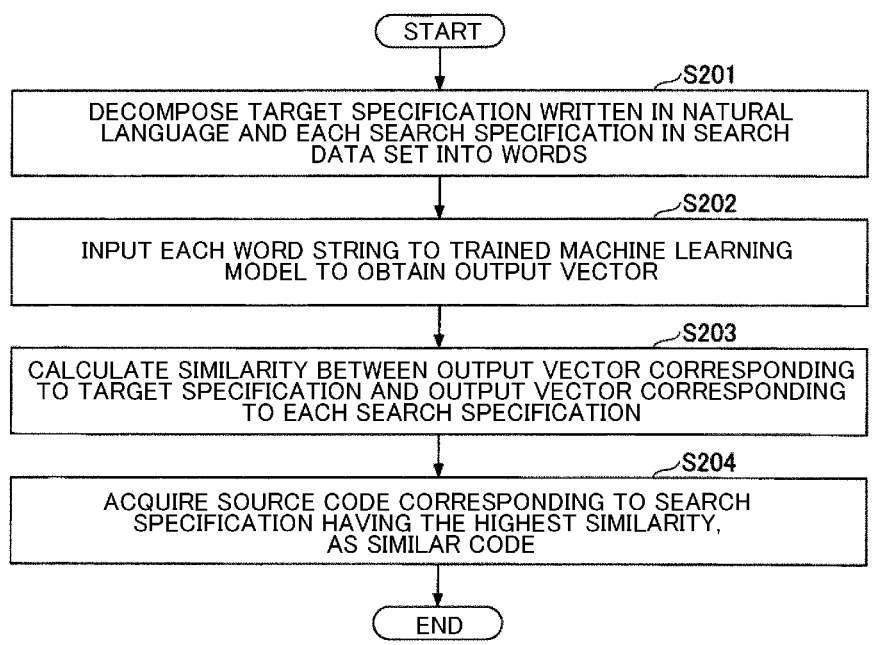
FIG. 6 is a flowchart showing an example of a processing procedure of similar code search processing.

Next, details of step S20 shown in FIG. 3 will be described. FIG. 6 is a flowchart showing an example of a processing procedure of the similar code search processing. In the similar code search processing, a search data set that is different from the search data set 16 used in the machine learning model training processing may be used.

In step S201, the similar code search unit 12 decomposes the specification (hereinafter referred to as the "target specification") written in natural language for the target program and search specifications included in respective search data pieces constituting the search data set 16 into words. As a result, a plurality of word strings (i.e., a word string of the target specification and word strings of the respective search specifications) are obtained.

Subsequently, the similar code search unit 12 inputs each of the plurality of word strings obtained in step S201 to the trained machine learning model to obtain a plurality of output vectors (step S202). Thus, an output vector corresponding to the target specification (i.e., an output vector obtained by inputting the word string of the target specification to the trained machine learning model) and output vectors corresponding to the respective search specifications (i.e., output vectors obtained by inputting word strings of the respective search specifications to the trained machine learning model) are obtained.

Subsequently, the similar code search unit 12 calculates similarity between the output vector corresponding to the target specification and an output vector corresponding to each search specification (step S203). For example, when the output vector corresponding to the target specification is referred to as an "output vector a" and output vectors corresponding to the respective search specifications are referred to as an "output vector $A_1$", an "output vector $A_2$", . . . , and an "output vector $A_n$", the similar code search unit 12 calculates similarity between the output vector a and the output vector $A_1$, similarity between the output vector a and the output vector $A_2$, . . . , and similarity between the output vector a and the output vector $A_n$. It should be noted that, as described above, cosine similarity can be used as the similarity between output vectors, for example.

Then, the similar code search unit 12 identifies search data that includes a search specification that corresponds to an output vector having the highest similarity among similarities calculated in step S203, and acquires a source code included in the identified search data as a similar code from the search data set 16 (step S204). Thus, out of source codes included in the search data set 16, the source code of a program having a structure that is close to the structure required for the specification of the target program is obtained as the similar code.

Figure 7:
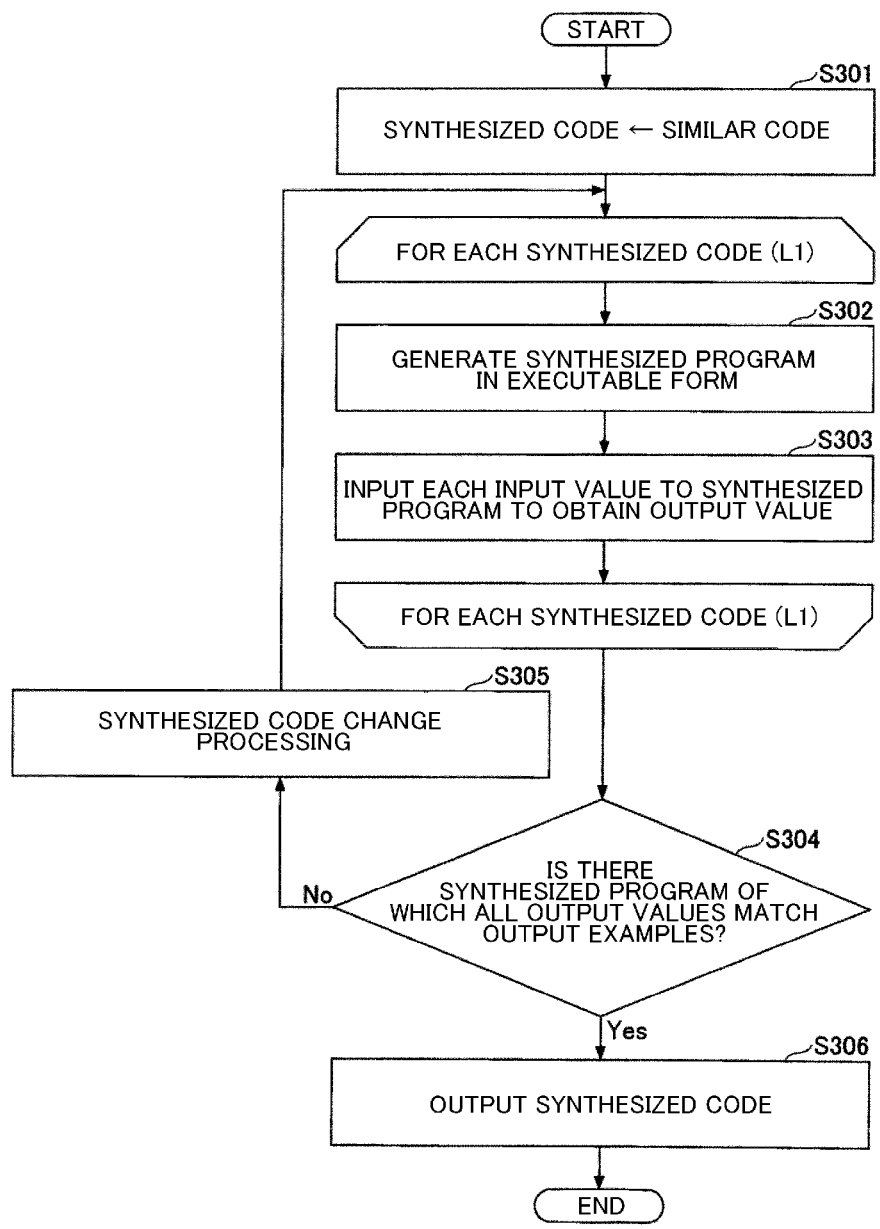
FIG. 7 is a flowchart showing an example of a processing procedure of program synthesis processing.

Next, details of step S30 shown in FIG. 3 will be described. FIG. 7 is a flowchart showing an example of a processing procedure of the program synthesis processing.

In step S301, the program synthesis unit 13 takes the similar code to be a synthesized code. The processing performed in step S301 is merely a change of the name.

Subsequently, loop processing L1 that includes steps S302 and S303 is executed for each synthesized code. In the following description, a synthesized code for which the loop processing L1 is performed will be referred to as a "target code". When the loop processing L1 is executed for the first time, the synthesized code is the single similar code.

In step S302, the synthesized program execution unit 14 generates a program (hereinafter referred to as a "synthesized program") in an executable form by performing compiling, linking, and the like on the target code.

Subsequently, the synthesized program execution unit 14 executes the synthesized program (hereinafter referred to as the "target synthesized program") by inputting an input value of each input-output example included in an input-output example set that is prepared in advance, to the target synthesized program, and obtains an output value for each input-output example (step S303) The input-output example set is information that indicates conditions to be satisfied by the target program with respect to input and output, and is set in advance and stored in the auxiliary storage device 102, for example.

Figure 8:
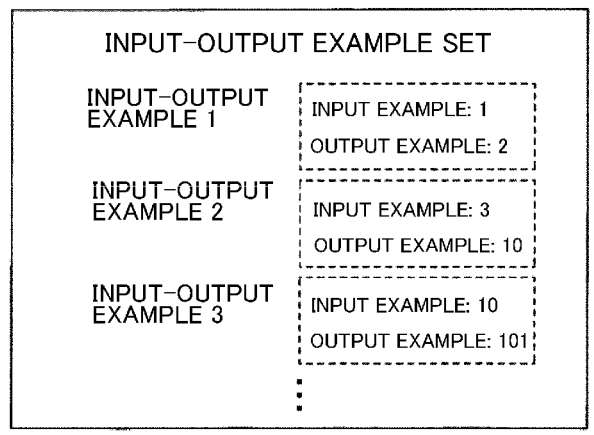
FIG. 8 is a diagram showing an example of an input-output example set.

FIG. 8 is a diagram showing an example of the input-output example set. The following is the data structure of the input-output example set shown in FIG. 8, which is written in a form that is based on the BNF notation.

<input-output example set>::=<input-output example>+
<input-output example>::=<input example><output example>
<input example>::=input value+
<output example>::=output value+

That is, the input-output example set includes one or more input-out examples. Each input-output example is a pair of an input example and an output example. The input example is one or more input values, and the output example is one or more output values.

For example, in a case where the input-output example set includes M input-output examples, in step S303, the synthesized program execution unit 14 executes the target synthesized program for each of M input values by inputting the input values, and obtains M output values.

When the loop processing L1 has ended, the input-output result determination unit 15 determines whether there is a synthesized program for which all output values match output examples of input-output examples to which input values corresponding to the output values belong (step S304). That is, it is determined whether there is a synthesized program for which all output values obtained in step S303 were as expected (correct), among synthesized programs for which the loop processing L1 has been performed. It should be noted that when step S304 is executed for the first time, the loop processing L1 is performed on only one synthesized program generated based on the similar code. Accordingly, in this case, the determination is performed on input-output results of this synthesized program in step S304.

If there is no synthesized program that satisfies the condition of step S304 (No in step S304), the program synthesis unit 13 executes synthesized code change processing (step S305). In the synthesized code change processing, a plurality of (N) synthesized codes are generated by partially changing the original synthesized code. For example, a genetic algorithm may be used to partially change the synthesized code. That is, a genetic operation may be performed N times on the synthesized code of the previous generation to generate N synthesized codes of the next generation. Here, N represents the number of individuals (source codes) of a single generation of the genetic algorithm. At this time, each synthesized code to which the genetic algorithm is applied is expressed using a tree structure in which an operator serves as a parent node and a variable, a constant, or an operator for which an operation is performed using the operator serves as a child node, for example, and the genetic operation is performed on a subtree of the tree structure. A pass rate of output values (a rate at which the output values were correct) may be used in evaluation for selecting individuals on which the genetic operation is performed N times.

For example, program components included in a program component list that is stored in the auxiliary storage device 102 in advance are used as candidates that replace a portion of the synthesized code of the previous generation in mutations.

Figure 9:
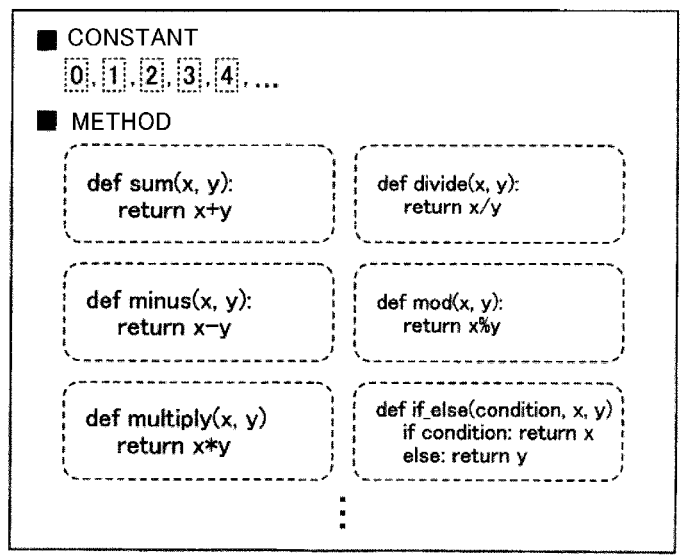
FIG. 9 is a diagram showing an example of a program component list.

FIG. 9 is a diagram showing an example of the program component list. The following is the data structure of the program component list shown in FIG. 9, which is written in a form that is based on the BNF notation.

<program component list>::=program component+

That is, the program component list includes one or more program components (source codes of the program components). In FIG. 9, the program components are categorized into constants and methods. Here, a single constant corresponds to a single program component, and a single method corresponds to a single program component. That is, each unit surrounded by a dashed line in FIG. 9 corresponds to a unit of a single program component.

It should be noted that when step S305 is executed for the first time, the individual (synthesized code) of the previous generation is the single similar code. Accordingly, in this case, N identical synthesized codes can be generated by copying the similar code, and the genetic operation can be performed N times on the N synthesized codes. As a result, N new synthesized programs are generated.

Figure 10:
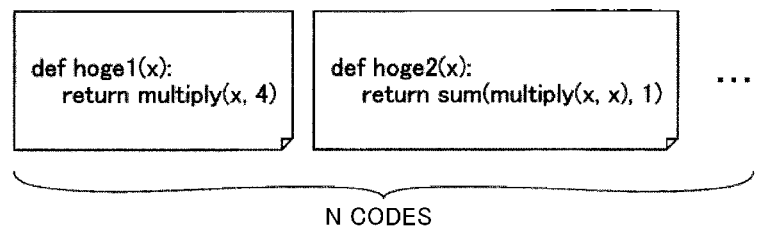
FIG. 10 is a diagram showing an example of synthesized codes that are generated through synthesized code change processing.

FIG. 10 is a diagram showing an example of synthesized codes generated through the synthesized code change processing. As shown in FIG. 10, N synthesized codes are generated as a result of synthesis processing being performed once.

It should be noted that an existing library such as DEAP (https://deap.readthedocs.io/en/master/) may be used for program synthesis processing in which the genetic algorithm is used.

Subsequently, the loop processing L1 and the following processing are executed for the N synthesized codes. Accordingly, in this case, steps S302 and S303 are executed N times.

On the other hand, if there is a synthesized program that satisfies the condition of step S304 (Yes in step S304), the input-output result determination unit 15 outputs the source code (synthesized code) of the synthesized program (step S306). That is, the synthesized program is determined to be the target program. If there are a plurality of synthesized programs that satisfy the condition of step S304, source codes of the respective synthesized programs can be output.

For example, in a case where the three input-output examples shown in FIG. 8 are all of the input-output examples constituting the input-output example set, the second synthesized code from the left in FIG. 10 is output as the target program (source code of the target program).

As described above, according to the present embodiment, a program that is expected to satisfy a specification of a program is automatically generated using two types of information, i.e., the specification (character string) of the program written in natural language and input-output examples. That is, according to the present embodiment, a source code of a program that has a structure close to the structure required for the specification of the target program (intention of the creator) is found from the search data set 16 that includes source codes and specifications of programs by using the machine learning model that has been caused to learn a relationship between natural language describing a specification of a program and similarity of the structure of the program, and then a program is repeatedly modified (changed) based on the found source code until a program that satisfies all input-output examples is generated. As a result, according to the present embodiment, it is possible to increase the possibility of the desired program (i.e., program that satisfies desired input-output examples) being automatically generated, when compared to conventional technologies.

It should be noted that in the present embodiment, the similar code is an example of a first program. The similar code search unit 12 is an example of a search unit. The program synthesis unit 13 is an example of a change unit. The target program is an example of a second program.

Although an embodiment of the present invention has been described in detail, the present invention is not limited to the specific embodiment, and various alterations and changes can be made within the scope of the gist of the present invention described in the claims.

REFERENCE SIGNS LIST

10 Program generation device
11 Training unit
12 Similar code search unit
13 Program synthesis unit
14 Synthesized program execution unit
15 Input-output result determination unit
16 Search data set
100 Drive device
101 Recording medium
102 Auxiliary storage device
103 Memory device
104 CPU
105 Interface device
106 Display device
107 Input device
B Bus

The invention claimed is:

1. A program generation device comprising a processor configured to execute a method comprising:
storing a set of pairs each constituted by a program and natural language that describes a specification of the program;
searching for a first program having a first structure that is closest to a second structure of a target program to be generated, from the set, by inputting a first natural language that describes a specification of the target program to be generated and a second natural language included in the pairs to a model that learnt a relationship between the second natural language describing the specification of the target program and similarity of the second structure of the target program; and changing the first program to generate a second program
that satisfies at least one pair of an input value and an
output value,
with respect to each pair included in the set:
the searching further comprises calculating similarity
between a first vector and a second vector, the first
vector being output when the first natural language
describing the specification of the target program to be
generated is input to the model, the second vector being
output when the second natural language included in
the pair is input to the model,
wherein the changing the first program to generate the
second program is based at least in part on a program
synthesis using a genetic algorithm.

2. The program generation device according to claim 1, wherein
with respect to each pair included in the set:
the searching further comprises finding, as the first
program, a program that corresponds to natural language for which a second vector for which the
calculated similarity is the highest is output.

3. The program generation device according to claim 2, wherein
the changing further comprises repeating a partial change
of the first program in a cumulative manner until the
second program is generated.

4. The program generation device according to claim 1, wherein
the changing further comprises repeating a partial change
of the first program in a cumulative manner until the
second program is generated.

5. The program generation device according to claim 4, wherein
the changing further comprises changing a portion of the
first program using a plurality of program components.

6. The program generation device according to claim 1,
wherein the at least one pair of the input value and the output
value is prepared in advance.

7. A computer implemented method for generating a program, comprising:
storing a set of pairs each constituted by a program and
natural language that describes a specification of the
program;
searching for a first program having a first structure that
is closest to a second structure of a target program to be
generated, from the set, by inputting a first natural
language that describes a specification of the target
program to be generated and a second natural language
included in the pairs to a model that has been caused to
learn a relationship between the first natural language
describing the specification of the target program and
similarity of second structure of the target program; and
changing the first program to generate a second program
that satisfies at least one pair of the input value and the
output value,
with respect to each pair included in the set;
the searching further comprises calculating similarity
between a first vector and a second vector, the first
vector being output when the first natural language
describing the specification of the target program to be
generated is input to the model, the second vector being
output when the second natural language included in
the pair is input to the model,
wherein the changing the first program to generate the
second program is based at least in part on a program
synthesis using a genetic algorithm.

8. The computer implemented method according to claim
7, wherein the changing the first program to generate the
second program is based at least in part on a program
synthesis using a genetic algorithm.

9. The computer implemented method according to claim
7, wherein the at least one pair of the input value and the
output value is prepared in advance.

10. The computer implemented method according to
claim 7, wherein
with respect to each pair included in the set:
the searching further comprises finding, as the first
program, a second program that corresponds to natural language for which a second vector for which the
calculated similarity is highest is output.

11. The computer implemented method according to
claim 10, wherein
the changing further comprises repeating a partial change
of the first program in a cumulative manner until the
second program is generated.

12. The computer implemented method according to
claim 11, wherein
the changing further comprises changing a portion of the
first program using a plurality of program components.

13. A computer-readable non-transitory recording
medium storing computer-executable program instructions
that when executed by a processor cause a computer to
execute a method comprising:
storing a set of pairs each constituted by a program and
natural language that describes a specification of the
program;
searching for a first program having a first structure that
is closest to a second structure of a target program to be
generated, from the set, by inputting a first natural
language that describes a specification of the target
program to be generated and a second natural language
included in the pairs to a model that has been caused to
learn a relationship between the first natural language
describing the specification of the target program and
similarity of second structure of the target program; and
changing the first program to generate a second program
that satisfies at least one pair of the input value and the
output value,
with respect to each pair included in the set:
the searching further comprises calculating similarity
between a first vector and a second vector, the first
vector being output when the first natural language
describing the specification of the target program to be
generated is input to the model, the second vector being
output when the second natural language included in
the pair is input to the mode,
wherein the changing the first program to generate the
second program is based at least in part on a program
synthesis using a genetic algorithm.

14. The computer-readable non-transitory recording
medium according to claim 13, wherein the at least one pair
of the input value and the output value is prepared in
advance.

15. The computer-readable non-transitory recording
medium according to claim 13, wherein
with respect to each pair included in the set:
the searching further comprises finding, as the first
program, a second program that corresponds to natural language for which a second vector for which the
calculated similarity is highest is output.

16. The computer-readable non-transitory recording
medium according to claim 15, wherein the changing further comprises repeating a partial change of the first program in a cumulative manner until the second program is generated.

17. The computer-readable non-transitory recording medium according to claim 16, wherein
the changing further comprises changing a portion of the first program using a plurality of program components.

* * * * *